(12) United States Patent
Perez

(10) Patent No.: US 10,582,271 B2
(45) Date of Patent: Mar. 3, 2020

(54) ON-DEMAND CAPTIONING AND TRANSLATION

(71) Applicant: VZP Digital, Centennial, CO (US)

(72) Inventor: Victor Z. Perez, Centennial, CO (US)

(73) Assignee: VZP Digital, Centennial, CO (US)

( * ) Notice: Subject to any disclaimer, the term of this patent is extended or adjusted under 35 U.S.C. 154(b) by 0 days.

(21) Appl. No.: 16/037,863

(22) Filed: Jul. 17, 2018

(65) Prior Publication Data

US 2019/0028772 A1 Jan. 24, 2019

Related U.S. Application Data

(60) Provisional application No. 62/533,807, filed on Jul. 18, 2017.

(51) Int. Cl.

| | |
|---|---|
| H04N 7/173 | (2011.01) |
| H04N 21/488 | (2011.01) |
| G10L 15/26 | (2006.01) |
| H04N 21/2187 | (2011.01) |
| H04N 21/233 | (2011.01) |
| H04N 21/439 | (2011.01) |
| G10L 15/30 | (2013.01) |
| H04N 21/2343 | (2011.01) |
| G06F 40/58 | (2020.01) |

(52) U.S. Cl.
CPC ......... *H04N 21/4884* (2013.01); *G06F 40/58* (2020.01); *G10L 15/265* (2013.01); *G10L 15/30* (2013.01); *H04N 21/2187* (2013.01); *H04N 21/233* (2013.01); *H04N 21/234336* (2013.01); *H04N 21/4394* (2013.01); *G10L 15/26* (2013.01)

(58) Field of Classification Search
CPC .......... H04N 21/4884; H04N 21/2187; H04N 21/233; H04N 21/4394
USPC ........................................................ 725/116
See application file for complete search history.

(56) References Cited

U.S. PATENT DOCUMENTS

| | | | | |
|---|---|---|---|---|
| 6,412,011 | B1 * | 6/2002 | Agraharam | ......... H04L 12/1836 709/231 |
| 8,582,565 | B1 * | 11/2013 | Morsy | ..................... H04L 67/02 348/14.04 |
| 9,055,337 | B2 * | 6/2015 | Elliott | .............. H04N 21/42201 |
| 10,194,209 | B2 * | 1/2019 | Hollinger | ......... H04N 21/47217 |
| 10,368,136 | B1 * | 7/2019 | Qureshi | ................. H04H 60/32 |
| 10,389,876 | B2 * | 8/2019 | Engelke | ............ H04M 3/42391 |
| 10,455,269 | B2 * | 10/2019 | Abed | ..................... H04H 60/48 |

(Continued)

*Primary Examiner* — Pankaj Kumar
*Assistant Examiner* — Sahar Aqil Riaz
(74) *Attorney, Agent, or Firm* — Adsero IP

(57) ABSTRACT

Novel tools and techniques are provided for a live and/or on-demand captioning service. A system may include a caption management server, and a source captioning device. The source captioning device may generate a request to initiate captioning service, transmit the request to the caption management server, transmit the audio content to a captioning service provider as determined by the caption management server, and receive, via the caption management server, caption data from the captioning service provider. The caption management server may determine a type of captioning service requested, and determine the captioning service provider for the source captioning device to transmit the audio content based, at least in part, on the type of captioning service requested.

18 Claims, 9 Drawing Sheets

(56) References Cited

U.S. PATENT DOCUMENTS

| | | | |
|---|---|---|---|
| 2002/0101537 A1* | 8/2002 | Basson | G09B 19/08 348/465 |
| 2003/0065503 A1* | 4/2003 | Agnihotri | G06F 17/2705 704/7 |
| 2003/0093260 A1* | 5/2003 | Dagtas | G06F 16/685 704/1 |
| 2003/0101150 A1* | 5/2003 | Agnihotri | G06F 16/9535 706/45 |
| 2010/0194979 A1* | 8/2010 | Blumenschein | G06F 17/289 348/468 |
| 2012/0023251 A1* | 1/2012 | Pyle | H04N 21/234327 709/231 |
| 2012/0066594 A1* | 3/2012 | Gavade | H04N 21/2743 715/716 |
| 2013/0086023 A1* | 4/2013 | Tsukamoto | G06F 16/24 707/705 |
| 2013/0185452 A1* | 7/2013 | Burckart | H04L 65/4084 709/231 |
| 2015/0020087 A1* | 1/2015 | Rose | H04N 21/4316 725/20 |
| 2015/0365716 A1* | 12/2015 | Fonseca, Jr. | H04N 5/44543 725/41 |
| 2016/0295293 A1* | 10/2016 | McLaughlin | H04N 21/4884 |
| 2016/0373830 A1* | 12/2016 | Ramnani | G06T 5/005 |
| 2017/0316792 A1* | 11/2017 | Chaudhuri | G10L 25/93 |
| 2018/0143970 A1* | 5/2018 | Skarbovsky | G06F 17/2735 |
| 2018/0143974 A1* | 5/2018 | Skarbovsky | G06F 17/2836 |

* cited by examiner

500A

ON-DEMAND CAPTIONING AND TRANSLATION

CROSS REFERENCE TO RELATED APPLICATIONS

This application claims priority to U.S. Provisional Patent Application Ser. No. 62/533,807 filed Jul. 18, 2017 by Victor Z. Perez, entitled "On-Demand Captioning and Translation," the entire disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to captioning technology, and more particularly, to tools and techniques for the dynamic delivery of captioning and translations.

BACKGROUND

Captioning of audiovisual content, such as broadcast television programs, cable television programs, and streaming media content, has become widely available. Captioning typically provides a transcript of the verbal audio in the audiovisual content, or provides textual information related to nonverbal audio, such as music or other nonverbal sounds.

To provide captioning information, broadcast signals for various television programming typically include both audiovisual data as well as caption data. Similarly, streaming media content may be transmitted with caption data, or additional metadata to be used for captioning.

Typically, a receiver is required to process both the audiovisual data, and to display captioning along with the audiovisual content. Receivers typically must rely on caption data that is embedded or transmitted with audiovisual data from a broadcast source to provide captioning. Thus, when audiovisual content is provided without caption data, it is impossible to provide captioning for the audiovisual content. This may occur, for example, during live events, such as live broadcasts and live video streams, or other audiovisual content for which caption data has not been created by a broadcaster or other content provider.

Accordingly, tools and techniques for real-time and/or on-demand captioning and translation of audiovisual content are provided.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
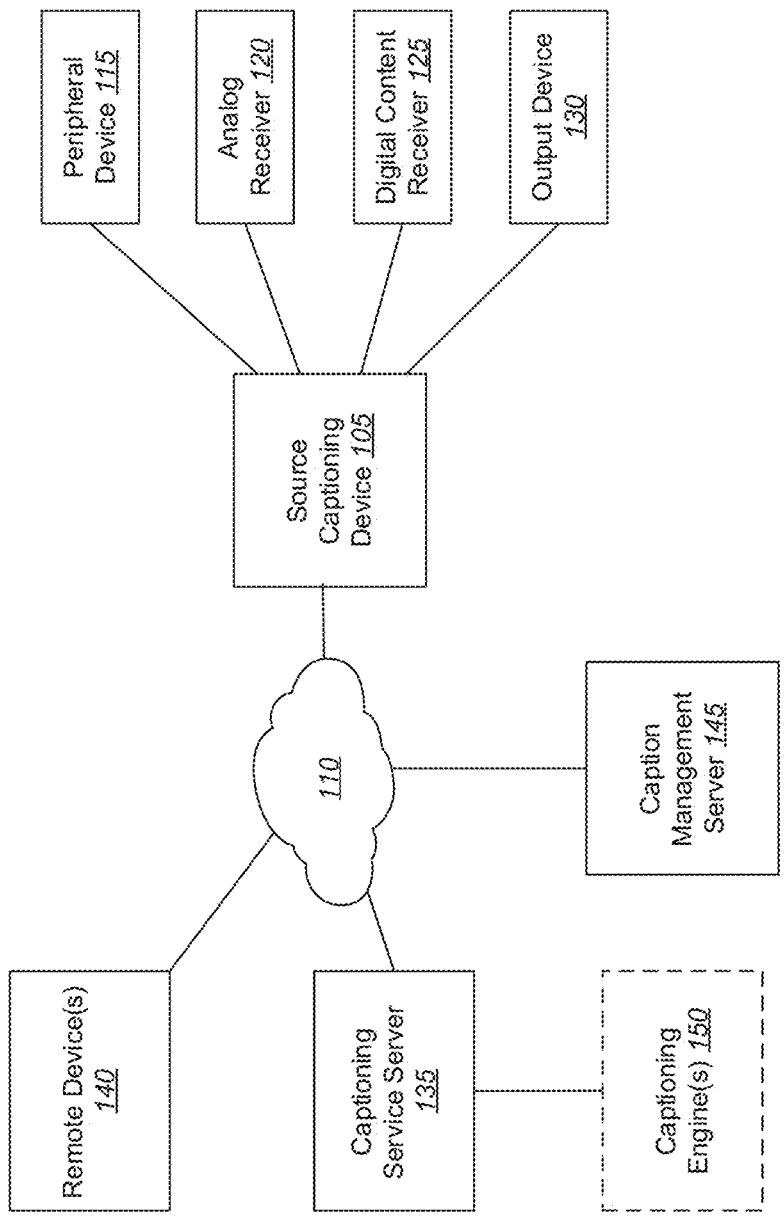
FIG. 1 is a block diagram illustrating a system for providing captioning services, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Certain embodiments provide tools and techniques for providing real-time and/or on-demand transcription and captioning services. The tools provided by various embodiments include, without limitation, systems, apparatuses, methods, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

In an aspect, on-demand captioning services may include the provisioning of caption data for audio content, upon request by a customer, or as scheduled by a customer. Audio content may include both analog and digital audio signals, which may be processed by a captioning service provider to generate captioning (e.g., caption data) associated with the audio signals, via a live or automated captioning service provider, and upon request by a customer. Conventional captioning systems are unable to provide such functionality. This is especially the case with live programming, or for events during which it may be desired to display captioning for a speaker or presentation. Typically, conventional systems rely on caption data embedded within or accompanying audiovisual content, by a broadcaster or content provider, in a format that can be displayed.

Accordingly, a system for on-demand captioning services is provided. The system may include a caption management server and a source captioning device in communication with the caption management server. The source captioning device may include a processor and non-transitory computer readable media having encoded thereon computer software comprising a set of instructions executable by the processor to perform various operations. For example, the source captioning device may be configured to generate a request to initiate captioning service, and transmit the request to the caption management server. The source captioning device may then receive, via one or more source inputs, audio content, and transmit the audio content to a captioning service provider as determined by the caption management server. The source captioning device may further receive, via the caption management server, caption data from the captioning service provider. The caption management server may be configured to receive, from the source captioning device, the request, and determine a type of captioning service requested. Based on the type of captioning service requested, the caption management server may then determine the captioning service provider for the source captioning device to transmit the audio content.

In another aspect, an apparatus for on-demand captioning services is provided. The apparatus may be a source captioning device, configured to generate a customer profile based on customer input, receive a request to initiate captioning service, and transmit the request to a caption management server. The apparatus may further be configured to receive audio content, transmit the audio content to a captioning service provider, as indicated by the caption management server, and receive, via the caption management server, caption data from the captioning service provider.

In a further aspect, a method for on-demand captioning services is provided. The method may include receiving, at a source captioning device, a request to initiate captioning service, transmitting, via the source captioning device, the request to a caption management server, and receiving, with the caption management server, the request. The method may further include determining, with the caption management server, a type of captioning service requested, and determining, at the caption management server, the captioning service provider for the source captioning device to transmit the audio content based, at least in part, on the type of captioning service requested. The method may then continue by connecting, via the caption management server, the source captioning device to a captioning service provider based, at least in part, on the type of captioning service requested, transmitting, via the source captioning device, audio content to the captioning service provider as determined by the caption management server, receiving, via the caption management server, caption data from the caption service provider, and transmitting, via the caption management server, the caption data to the source captioning device.

Various modifications and additions can be made to the embodiments discussed without departing from the scope of the invention. For example, while the embodiments described above refer to specific features, the scope of this invention also includes embodiments having different combination of features and embodiments that do not include all the above described features.

FIG. 1 is a block diagram of a system 100 for providing captioning services. The system 100 of FIG. 1 comprises a source captioning device 105, a network 110, a peripheral device 115, an analog receiver 120, a digital content receiver 125, an output device 130, a captioning service server 135, remote device(s) 140, a caption management server 145, and captioning engine(s) 150. It should be noted that the components of the system 100 are schematically illustrated in FIG. 1, and that a variety of hardware configurations are possible in accordance with various embodiments.

Merely by way of example, in some cases, the source captioning device 105 might be implemented as a hardware system, or as a process executed on a computer system. Similarly, the caption management server 145 and/or captioning service server 135 may be implemented as a process executed on a respective computer system. In other embodiments, the source captioning device 105 and captioning service server 135, or alternatively, the captioning service server 135 and caption management server 145, may be implemented as processes running on the same computer system. Exemplary computer systems that can serve as captioning service servers 135, caption management servers 145, and/or source captioning 105 devices are described below with respect to FIG. 6.

According to various embodiments, the source captioning device 105 may be operatively coupled to peripheral device 115, analog receiver 120, digital content receiver 125, and output device 130. The source captioning device 105 may further be communicatively coupled, via network 110, to the caption management server 145, and captioning service server 135. The captioning service server 135 may be coupled to one or more captioning engines 150, and one or more of caption management server 145, source captioning device 105, or one or more remote devices 140 via the network 110. The caption management server 145 may similarly be coupled to the captioning service server 135, one or more remote devices 140, or the source captioning device 105 via the network 110.

In various embodiments, the source captioning device 105 may include hardware, software, or both hardware and software. For example, the source captioning device 105 may include a computer system including a processor (such as a microcontroller, ARM controller, one or more microprocessors, etc.) and system memory configured to store various program instructions for performing various functions described herein. In further embodiments, the source captioning device 105 may be implemented as part of a field programmable gate array (FPGA), application specific integrated circuit (ASIC), system on a chip (SoC), microcontroller (MCU), single board computers such as Arduino, Raspberry Pi, etc., and other embedded solutions.

In various embodiments, the source captioning device 105 may include any program or process that is configured to receive customer inputs, audio data, and generate requests for captioning service. For example, the source captioning device 105 may be a standalone device, such as a computer, mobile device, set top box, or may be implemented as a process running on an existing device. In further embodiments, the source captioning device 105 may be configured to interface with an existing device, such as a peripheral device 115, analog receiver 120, digital content receiver 125, a personal computer, tablet computer, smart phone, or other mobile device. Thus, the source captioning device 105 may, in some embodiments, include a dedicated appliance, such as a dongle, adapter, or other type of attachment which may leverage the processing capabilities of an existing device to perform various functions, or to provide additional capabilities to the existing device, as described below.

In some embodiments, the source captioning device 105 may provide the ability to generate a customer profile based on customer inputs. In one example, this may include generating a user interface through which customer inputs may be selected. The customer profile may allow a customer to input various preferences related to captioning services, including, but not limited to, a preference as to a specific captioning service provider to be used, language preferences, audio source preferences, and a preference for live or automated captioning services. In various embodiments, captioning service may refer to, without limitation, closed or open captioning, translation, and transcription services for various sources of audio content. Automated captioning services may include captioning services provided by one or more captioning engines 150. The one or more captioning engines 150 may include, without limitation, automated speech recognition engines (including artificial intelligence (AI) engines), speech-to-text engines, and translation engines. Accordingly, the one or more captioning engines 150 may include various proprietary software and/or systems (e.g., hosted on the caption management server 145 or captioning service server 135, or hosted by a third-party service provider), or utilize commercially available third-party software and systems (e.g., a captioning service server 135 operated by a third party automated captioning service provider). Thus, the source captioning device 105 may further be configured to provide audio content to the appropriate captioning service, as indicated by the caption management server 135. In some further embodiments, the source captioning device 105 may be configured to utilize one or more different captioning engine(s) 150. For example, the source captioning device 105 may be configured to provide audio content to one or more different captioning engines 150, via the captioning service servers 135.

The outputs from the captioning engines 150 may then be processed by the captioning service server 135 and/or caption management server 145. For example, in some embodiments, caption data may be obtained by selecting between the outputs of the one or more captioning engines 150. In some examples, the captioning service server 135 may be configured to automatically select a captioning engine 150 based on the type of source input (e.g., a live program, lecture, presentation, movie, television show, etc.), a language of the source input, etc. For example, the captioning service server 135 may determine that one captioning engine 150 may perform better for live programs and lectures than another captioning engine 150; one captioning engine 150 may work better for English than Asian languages. In other embodiments, caption data output by each of the one or more captioning engines 150 may be selected based on accuracy. Accordingly, in some embodiments, the captioning service server 135 and/or caption management server may be configured to utilize multiple captioning engines from the one or more captioning engines 150 for the same content, and select caption data generated by the one or more captioning engines 150 based on accuracy of the caption data output by the respective captioning engine 150. In some embodiments, a captioning service provider, a live caption resource, or the user requesting the captioning service may manually select between caption data output by a respective captioning engine 150. In further embodiments, a combination of one or more captioning engines 150 and/or live caption resources may be employed. In one example, a first captioning engine of the one or more captioning engines 150 may include an English language speech-to-text engine may be utilized, by the captioning service server 135, to transcribe the English language audio content into English language text. A second captioning engine of the one or more captioning engines 150 may include, without limitation, an English to Spanish translation engine configured to translate the English language text into Spanish language text. Those skilled in the art will appreciate that transcription and translation may occur between any other combination of languages in a manner similar to the example described above.

The source captioning device 105 may further be operatively coupled to peripheral device(s) 115, an analog receiver 120, a digital content receiver 125, an output device 130. Peripheral device(s) 115 may include, without limitation, recording devices, such as a microphone, through which audio content may be directly recorded. The analog receiver 120 may include receivers for analog audio content, such as, without limitation, analog set top boxes, analog television and/or radio tuners, media players, or other device configured to output an analog audio signal. The analog receiver 120 may be configured to receive the analog audio content from various sources, including, without limitation, audio feeds (e.g., line out signals) from an audio driver, digital-to-audio converter, audio from a television, or audio from other computing devices. The analog receiver 120 may further include television and/or radio receivers configured to receive over the air (OTA) broadcast signals, such as television and/or radio signals, including analog audio content. The digital content receiver 125 may include receivers configured to receive digital audio content, such as, without limitation, streaming media players, set top boxes, personal computers, etc. Digital content may include audio content from digital sources, such as various digital audio files, compact discs, optical audio signals, audiovisual media content including streaming music and video, and/or OTA digital broadcast signals. In some further embodiments, the source captioning device 105 or the digital content receiver 125, may include a DAC to convert the digital audio content to an analog audio signal. In other embodiments, the digital content receiver 125 and/or the source captioning device 105 may simply transmit the digital audio content. Accordingly, the source captioning device 105 may include various types of digital interfaces through which the source captioning device 105 may be coupled to the digital content receiver 125. For example, in some embodiments, the source captioning device 105 may be configured to obtain a source input (e.g., audio content) via one or more of a serial connection (e.g., universal serial bus (USB), etc.), or via a network location (e.g., a local and/or external IP address, a web address (URL), etc.).

The source captioning device 105 may be configured to receive caption data for the audio content, via the captioning service server 135, or alternatively, the caption management server 145. The source captioning device 105 may be configured to then cause the caption data to be displayed. In some embodiments, the source captioning device 105 may be coupled to an output device 130 configured to display the caption data. Caption data may include any or all of open and closed captions, textual transcripts, translations, and/or metadata related to one or more of the audio content, captions, transcripts, or translations. In some embodiments, the caption data may be embedded within, or provided as metadata accompanying, visual content data via the source captioning device 105. The visual content data may include the video content part of digital audiovisual content, or an analog video signal for display. In some examples, visual content data may include rendering information for displaying the caption data as text, with or without other video content.

Thus, in some embodiments, the source captioning device 105 may be configured to generate a digital or analog visual content signal including the caption data. The source captioning device 105 may be configured to transmit the audio, visual, or audiovisual content, including the caption data, for display at a display device 130. Accordingly, the display device 130 may include any device capable of displaying video content, such as, without limitation, an electronic display (e.g., television, computer monitor, mobile device, etc.) or a projector. In some embodiments, the source captioning device 105 may comprise at least part of the display device 130, such as, for example, a built-in projector.

Accordingly, in some embodiments, the source captioning device 105 may be configured to transmit audio, video, or audiovisual content including the caption data directly for display at the output device 130. For example, the source captioning device 105 may provide audio, video, or audiovisual content and caption data to the output device 130. In other embodiments, the source captioning device 105 may be configured to interface with one or more of the peripheral device 115, analog receiver 120, or digital content receiver 125 to provide caption data to the output device. For example, the source captioning device 105 may provide caption data to one or more of the peripheral device 115, analog receiver 120, or digital content receiver 125. One or more of the peripheral device 115, analog receiver 120, or digital content receiver 125 may output the audio, video, or audiovisual content along with the caption data to the output device 130 for display at the output device 130. Alternatively, one or more of the peripheral device 115, analog receiver 120, or digital content receiver 125 may output audio, video, or audiovisual to the output device 130, while the source captioning device 105 may provide caption data to the output device 130.

In various embodiments, the caption management server 145 may be a server computer that includes a program or process that is configured to cause the caption management server 145 to receive a request for captioning service from the source captioning device 105, handle the request for captioning service as described below, interface with a captioning service provider to receive the caption data, and transmit caption data to the source captioning device 105. For example, in some embodiments, the caption management server 145 may determine, based on the request, a type of captioning service requested by the customer. For example, the request may indicate whether automated captioning or live captioning is requested. The caption management server 145 may further determine whether to use one or more captioning engines 150, whether to perform translations, source audio language, desired caption language, etc. For example, in some embodiments, the caption management server 145 may be configured to determine whether a customer profile exists for a user associated with the source captioning device 105. In some embodiments, the source captioning device 105 may be configured to transmit the customer profile to the caption management server 145. If a customer profile exists, the caption management server 145 may determine captioning service provider preferences indicative of one or more captioning engines 150 to utilize and/or a respective captioning service server 135 to use. In some embodiments, the caption management server may cause the source captioning device 105 and/or other device associated with the source captioning device 105 (e.g., peripheral device 115, analog receiver 120, or digital content receiver 125) to provide audio content to an appropriate one or more captioning engines 150 accordingly.

In other embodiments, if no preferences for a captioning engine or captioning service provider are available, the caption management server 145 may obtain captioning service provider preferences from the customer directly. For example, in some embodiments, the caption management server 145 may generate an interface through which the customer may indicate preferences or select options for the requested captioning service. For example, the interface may be presented as an application, web portal, cloud management platform to the customer. In some embodiments, the interface may be accessible, via the source captioning device 105, at the output device 130. In further embodiments, the interface may be accessible remotely, via the internet or other network connection. In various embodiments, a customer may be able to access and manage a respective user account via a web portal or cloud management platform. Accordingly, the caption management server 145 may be configured to authenticate and authorize a user. Accordingly, in some examples, a user may be authenticated and/or authorized based on, without limitation, a unique identifier, username, password, personal identification number (PIN), an encrypted alphanumeric code or message (e.g., public-key encryption), digital rights management (DRM) information, other security credentials, or a combination of the above.

In some embodiments, a user may indicate, at the caption management server 145, one or more captioning engines 150 and/or captioning service providers to utilize, indicate whether to request live or automated captioning, indicate a default translation language, schedule and/or initiate requests for captioning via the interface. In yet further embodiments, the user may be able to access and review caption data (and/or associated audio, video, or audiovisual content) for previously captioned content. Once the customer's captioning service provider preferences have been determined, the caption management server 145 may then connect the source captioning device to an appropriate captioning service provider at captioning service server 135, as indicated by the captioning service provider preferences.

In embodiments where the caption management server 145 determines, based on the request and/or customer profile, that automated captioning service is requested, the caption management server 145 may further determine which automated captioning service provider (e.g., captioning engine 150) to connect to the source captioning device 105. This may include selecting between various commercially available automated captioning services, or an automated captioning service hosted by the caption management server 145 or captioning service server 135. Once an automated captioning service provider to use has been determined, the caption management server 145 may connect the source captioning device 105 to the automated captioning service provider and/or captioning engine 150, for example via the captioning service server 135.

In embodiments where the caption management server 145 determines, based on the request and/or customer profile, that live captioning service is requested, the caption management server 145 may determine whether the live caption resource is available, as will be described in more detail below, with respect to FIG. 2. A live caption resource may refer to a human operator, such as, without limitation, a live stenographer, or voice transcriptionist. In some embodiments, the caption management server 145 may further be configured to schedule and/or request the live caption resource for a future time or set an appointment with the live schedule resource. In other embodiments, the caption management server 145 may be configured to allow the source captioning device 105 to request the live caption resource on-demand. In embodiments where it is determined that the live caption resource is available, the caption management server 145 may be configured to connect the source captioning device to the live captioning service provider via, for example, the captioning service server 135. In embodiments where it is determined that the live caption resource is not available, the caption management server 145 may connect the source captioning device 105, instead, to an automated captioning service provider until the live caption resource becomes available. In some embodiments, the automated captioning service provider may be selected based on the customer profile, or the customer may be prompted to select an automated captioning service provider, via the source captioning device 105.

In various embodiments, once the source captioning device 105 has been connected to the appropriate captioning service server 135, the source captioning device 105 may be configured to directly transmit audio content directly to the captioning service server 135, via network 110. In some embodiments, the caption data generated by the captioning service server 135 may then be transmitted to one or more of the caption management server 145 or source captioning device 105, via network 110. In some examples, this may include providing the caption data to the caption management server 145 in addition to the source captioning device 105. In further embodiments, the caption data may be provided by the caption management server 145 to the source captioning device 105. In various embodiments, the network 110 may include telecommunication networks, such as, without limitation, a local area network, wide area network, the internet, and other suitable networks for facilitating the communications described.

In various embodiments, the caption management server 145 and/or the captioning service server 135 may be configured to generate, from the caption data, one or more captioning files and/or formats. For example, in some embodiments, caption data may be a text transcription provided via the one or more captioning engines 150. The caption data, however, may not include timestamps or other time information relative to audio, video, or audiovisual content. Accordingly, the caption data may be converted into one or more different captioning files and/or formatted to be compliant with various captioning formats. Captioning files and/or formats may include, without limitation, CEA-608/708 compliant streams, WebVTT, .SRT, traditional closed captioning, e-captioning, and other timed text files and/or formats.

In further embodiments, the caption management server 145 may further be configured to provide an application programming interface (API) through which the caption data may be accessed by one or more remote devices 140, as will be described in greater detail below with respect to FIG. 3. For example, remote devices 140 may include mobile devices, computers, laptops, tablet computers, smart appliances (e.g., smart refrigerators, thermostats, stovetops, and the like), that may not be in direct communication with the source captioning device 105 to receive caption data from the source captioning device 105. The one or more remote devices 140 may be configured access caption data from the caption management server 145 using, for example, an app or other software configured to interface with the caption management server 145 via the API. This may allow the remote devices to access a transcript of the audio content through a connection to network 110, from a remote location away from source captioning device 105.

In some embodiments, the caption management server 145 may further be in communication with third party devices to provide the caption data, or metadata associated with one of the caption data or audio content, to the third party devices. As previously described, in some examples, the caption data may include metadata associated with one or more of open or closed captioning, transcripts, translations, or the audio content. Third parties associated with the third party devices may include search engines, content management providers, social media platforms, television and/or cable broadcasting systems, streaming video platforms, and the like. Accordingly, data associated with the audio content and/or caption data may be analyzed for metadata that may be useful for the third party platforms. In further embodiments, the caption management server 145 may interface with the third party devices to place key data in the API streams of the third party platforms. In some examples, this may allow the caption data to be accessed by users via third party platforms (e.g., through third party devices).

Examples describing various modes of operation of the system 100 are described below and in the Appendix. FIGS. 2-4 illustrate various configurations for respective modes of operation of the system 100.

Figure 2:
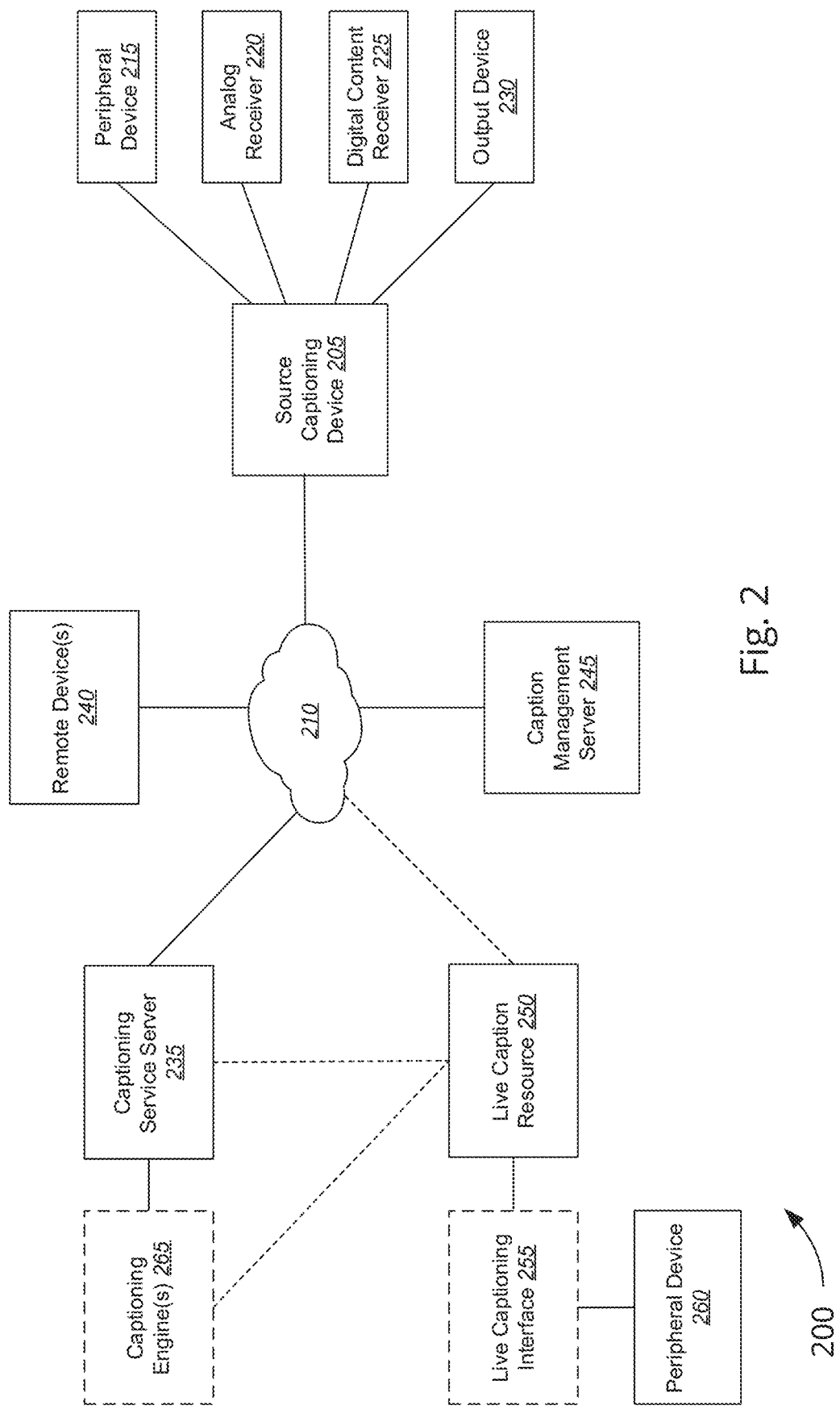
FIG. 2 is a block diagram illustrating a system for providing automated or live captioning services, in accordance with various embodiments.

FIG. 2 is a block diagram of a system 200 for providing automated and/or live captioning services. The system 200 of FIG. 2 comprises a source captioning device 205, a network 210, a peripheral device 215, an analog receiver 220, a digital content receiver 225, an output device 230, a captioning service server 235, a caption management server 245, a live caption resource 250, live captioning interface 255, peripheral device 260, and one or more captioning engines 265. It should be noted that the components of the system 200 are schematically illustrated in FIG. 2, and that a variety of configurations are possible in accordance with various embodiments.

As described above with respect to FIG. 1, in embodiments where the caption management server 245 determines, based on the request and/or customer profile, that live captioning service is requested, the caption management server 245 may determine whether the live caption resource 250 is available. As illustrated in FIG. 2, in some embodiments, the live caption resource 250 may be configured to be coupled directly to the captioning service server 235, while in other embodiments, the live caption resource 250 may be configured to communicate with at least one of the captioning service server 235, caption management server 245, or source captioning device 205, via the network 210.

In various embodiments, the live caption resource 250 may include, without limitation, a computer system associated including a processor (such as a microcontroller, ARM controller, one or more microprocessors, etc.) and system memory configured to store various program instructions for performing various functions described herein. In further embodiments, the live caption resource 250 may be implemented as part of a field programmable gate array (FPGA), application specific integrated circuit (ASIC), system on a chip (SoC), microcontroller (MCU), single board computers such as Arduino, Raspberry Pi, etc., and other embedded solutions. The live caption resource 250, for example, may be associated with a user, such as a stenographer, voice transcriptionist, or translator. The live caption resource 250 may be configured to receive source input data, from the captioning service server 235, or in some examples, from the source captioning device 205, via the network 210. The live caption resource 250 may further be configured to allow the user of the live caption resource 250 to provide caption data to one or more of the captioning service server 235 or caption management server 245.

In some embodiments, the live caption resource 250 may be coupled to a live captioning interface 255. The live captioning interface 255, in some embodiments, may be implemented as software running on the live caption resource 250, or may be a dedicated appliance, such as a dongle, adapter, or other type of attachment which may leverage the processing capabilities of an existing device, in this case the live caption resource 250, to perform various functions, or to provide additional capabilities to the existing device, as described below.

In various embodiments, the live captioning interface 255 may be configured to provide, to a user of the live caption resource 250, audio content for transcription and/or translation. In various embodiments, the live captioning interface 255 may further be coupled to a peripheral device 260 through which a user (e.g., stenographer, voice transcriptionist, or translator) may provide captioning to the live caption resource 250. For example, the peripheral device 260 may include a stenotype, keyboard, or microphone, through which captioning may be provided to live caption resource 250. Accordingly, in some examples, for a voice transcriptionist, the live caption resource 250 may include a speech-to-text engine.

In various embodiments, the live caption resource 250 may then transmit the caption data to one or more of the captioning service server 235 or caption management server 245. In further embodiments, the live captioning interface 255 may be configured to allow a user of the live caption resource 250 to select between captioning inputs. For example, the live captioning interface 255 may be configured to allow a user to select between captioning inputs from one or more peripheral devices (e.g., a stenotype, keyboard, or microphone), or one or more captioning engines 265 (e.g., an ASR or other automated captioning service provider). In some examples, switching between captioning inputs may include, without limitation, specifying a COM port (e.g., serial port), a local and/or external IP address for one or more captioning engines 265 and/or captioning service server 235, a web address for one or more captioning engines 265 and/or captioning service server 235, or manually entering text with a keyboard or stenotype. Accordingly, in some embodiments, caption data may be generated via one or more inputs at the live caption resource 250, one or more automated captioning services (e.g., the one or more captioning engines 265), or a combination of the live caption resource 250, and one or more captioning engines 265. For example, in some embodiments, a live stenographer or voice transcriptionist may create caption data in, for example, English. The English language caption data may then be provided to a translation engine of the one or more captioning engines 265, for example, an English to French translation engine. The translation engine may then be configured to translate the English language text, provided by the live caption resource 250, into French language text. The French language text may then be used to generate French language caption data, for example, at the captioning service server 235 and/or, alternatively, the caption management server 245. In yet further embodiments, a first live caption resource 250 may provide transcribed text to a live translator (not shown). Thus, a combination of two or more live caption resources 250 may similarly be utilized to provide transcription and translation. In yet further examples, a machine transcription from one of the one or more captioning engines 265 may be provided, via the live caption resource, to one or more live translators (e.g., live caption resource 250) for live translation into multiple languages. Those skilled in the art will appreciate that transcription and translation may occur between any other combination of languages, utilizing any combination of live caption resources 250 and captioning engines 265 as described in the examples, and are not limited to any of the specific examples.

As previously described, the caption data may be provided, via the live caption resource 250 and/or one or more caption engines 265, to one or more of the captioning service server 235 or caption management server. The caption data provided by the live caption resource 250, or in some examples, a combination of live captioning and automated captioning provided by the one or more captioning engines 265, may be textual data without associated timestamps or other time information associated with the source input (e.g., audio, video, or audiovisual content). Accordingly, the captioning service server 235 and/or caption management server 245 may be configured to generate a captioning file and/or format based on the caption data, thereby associating the text of the caption data with time information. Captioning files and/or formats may include, without limitation, CEA-608/708 compliant streams, WebVTT, .SRT, and other timed text files and/or formats.

In some further embodiments, the captioning service server 235 and/or caption management server 245 may be configured to automatically generate the captioning files and/or formats from the caption data. In some further embodiments, the captioning service server 235 and/or caption management server 245 may be configured to provide an interface through which time information may manually be associated with time information. For example, the captioning service server 235 and/or caption management server 245 may provide a portal through which the live caption resource 250 (or user associated with the live caption resource), a user requesting the captioning (e.g., user associated with the source captioning device 205), a captioning service provider, a third party, or a remote user may add, delete, or modify the caption data and time information.

Figure 3:
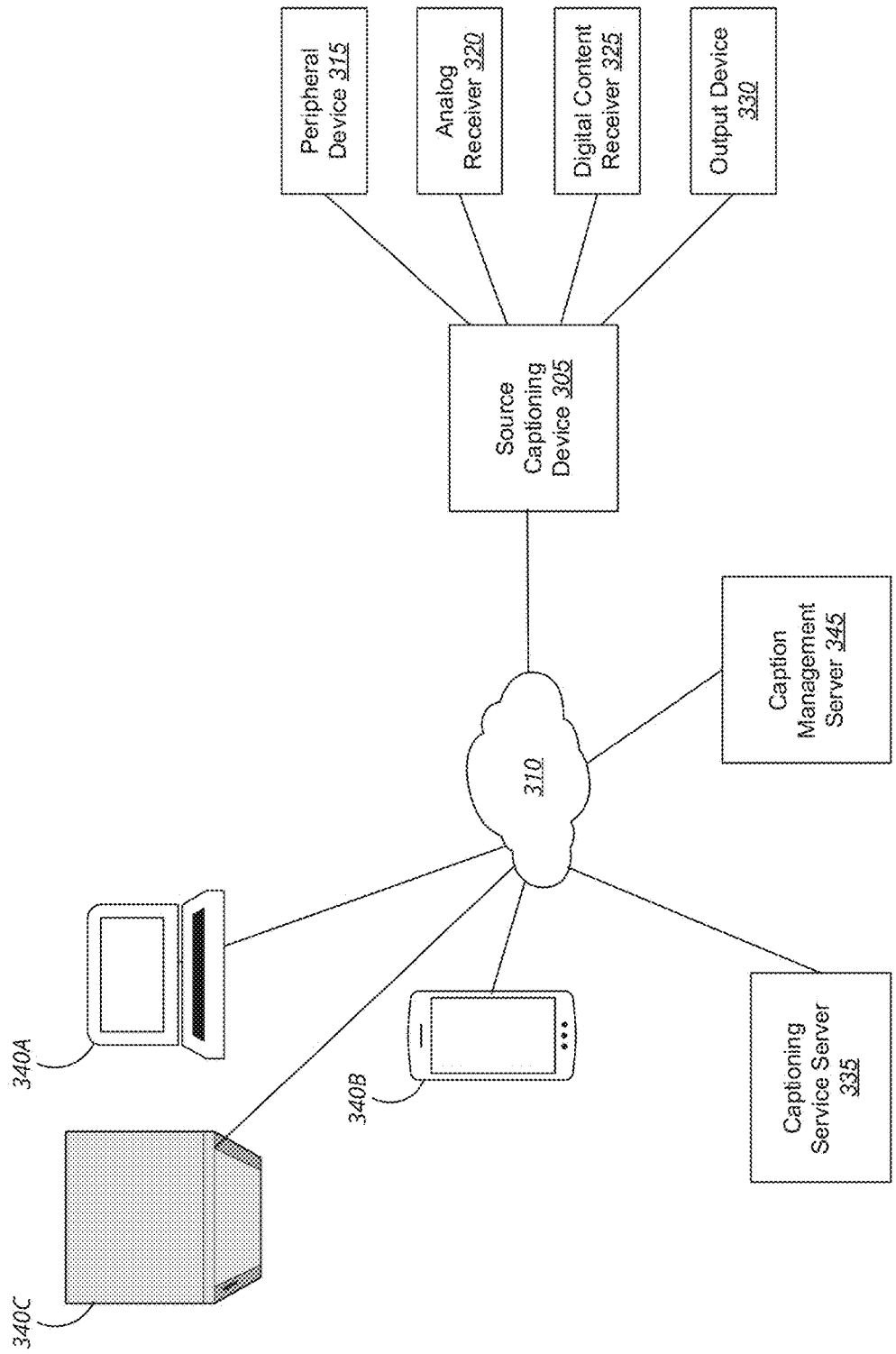
FIG. 3 is a block diagram illustrating a system for providing remote device access to captioning services, in accordance with various embodiments.
Figure 4:
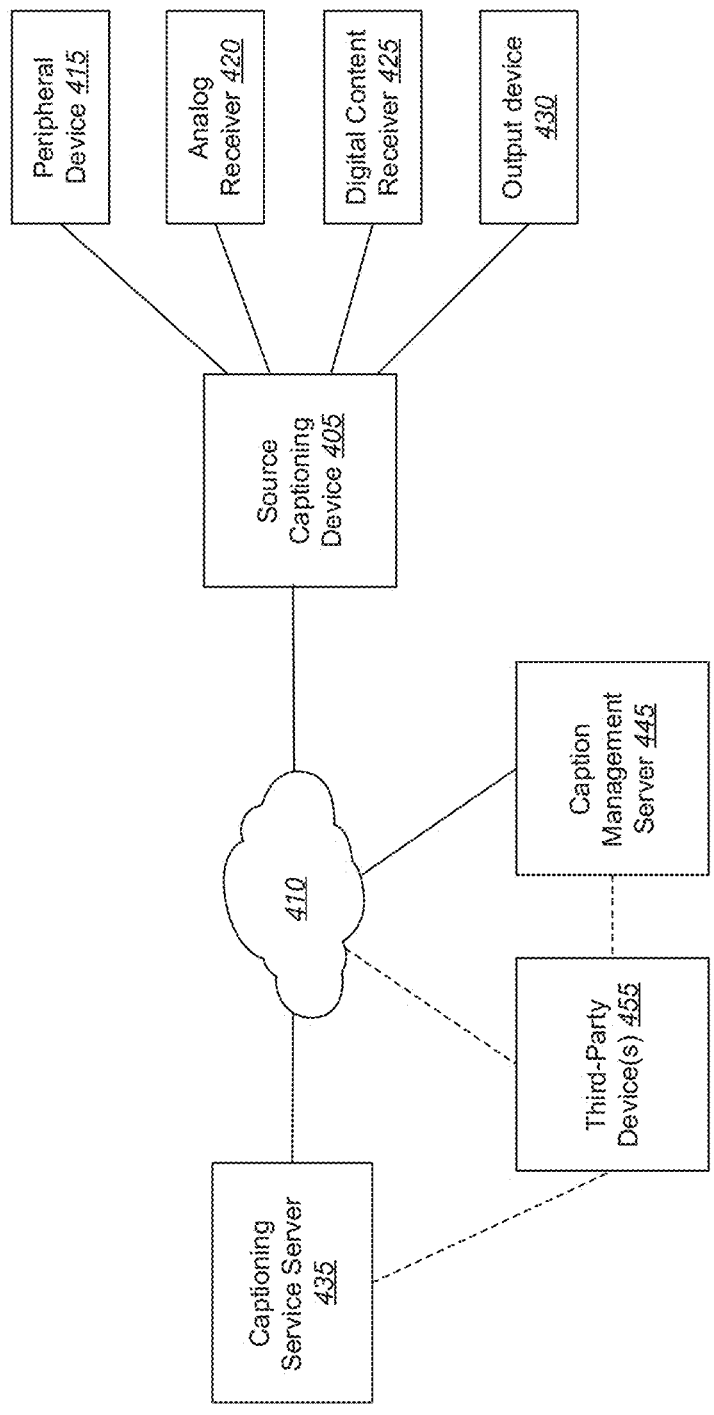
FIG. 4 is a block diagram illustrating a system for interfacing with third party systems, in accordance with various embodiments.

FIG. 3 is a block diagram of a system 300 for providing remote device access to captioning services. The system 300 of FIG. 3 comprises a source captioning device 305, a network 310, a peripheral device 315, an analog receiver 320, a digital content receiver 325, an output device 330, a captioning service server 335, remote device(s) 340A-340C, and a caption management server 345.

As described above with respect to FIG. 1, the caption management server 345 may be configured to provide an API through which the caption data may be accessed by one or more remote devices 340A-340C. As depicted in FIG. 3, the remote devices 340A-340C may include computers 340A, mobile devices 340B, and smart appliances 340C (e.g., smart refrigerators, thermostats, stovetops, and the like), that may not be in direct communication with the source captioning device 305. The one or more remote devices 340A-340C may be configured access caption data from the caption management server 345 using, for example, an app or other software configured to allow each respective remote device 340A-340C to interface with the caption management server 345 via the API.

In various embodiments, the caption management server 345 may be configured to provide a system as a service (SaaS) cloud platform providing a client portal for requesting, monitoring, and managing captioning services. The caption management server 345 may further be configured to manage invoicing, billing and device updates (e.g., the source captioning device 305). In some embodiments, the caption management server 345 may further be configured to distribute real-time text streaming service in a scalable manner according to the number of remote device 340 accessing caption data for particular audio, video, or audio-visual content.

FIG. 4 is a block diagram of a system 400 for interfacing with third party systems. The system 400 of FIG. 4 comprises a source captioning device 405, a network 410, a peripheral device 415, an analog receiver 420, a digital content receiver 425, an output device 430, a captioning service server 435, and a caption management server 445. Additionally, the system 400 includes third party device(s) 455.

As described above with respect to FIG. 1, in some embodiments, the caption management server 445 may further be in communication with third party device(s) 455 to provide the caption data, or metadata associated with one of the caption data or audio content, to the third party device(s). Accordingly, the caption management server 445 may interface with the third party device(s) to place key data in the API streams of the third party platforms. In some embodiments, as depicted, the third party device(s) 455 may be in direct communication with the caption management server 445, while in other embodiments, the third party device(s) may be coupled to the caption management server 445 via network 410. In some embodiments, this may allow the caption data to be accessed by users via third party platforms (e.g., through third party device(s) 455), via the network 410, or directly from the third party device(s) 455 themselves.

In some embodiments, the source captioning device 405 may be configured to provide on-demand captioning for live broadcasts and/or events. For example, typically, for a live television broadcast (e.g., breaking news, etc.), broadcasters would often have to wait for live caption resources (e.g., a stenographer) to become available before a live broadcast could be transmitted. In contrast, by using the source captioning device 405, a live broadcast may be automatically captioned by one or more captioning engines via the captioning service server 435 until a live caption resource becomes available, or captioning may be handled entirely automatically. Caption data may be provided to third-party devices 455 of the broadcaster, via one or more of the captioning service server 435 or caption management server 445.

In some embodiments, the third-party broadcaster may require caption data to be in a specific format. Accordingly, the one or more of the captioning service server 435 and/or caption management server 445 may be configured to generate caption data in the appropriate format. For example, for a news broadcaster, caption data may need to be formatted for a traditional closed captioning encoder. Thus, the third party device 455, in this case, may be the traditional closed captioning encoder. The one or more of the captioning service server 435 and/or caption management server 445 may, thus, be configured to transmit the appropriate caption data to the third party device 455 to be added to the broadcast content before it is broadcasted OTA. In another example, the third-party device 455 may include, for example, a live braille device or braille printer. Accordingly, the captioning service server 435 and/or caption management server 445 may be configured to interface with and provide appropriate caption data (e.g., text) to a live braille device or braille printer. For example, a live braille device may include a wearable, haptic device configured to provide a braille output in substantially real-time. The live braille device may require a text-based source to provide a braille output. Thus, the source caption device 405 may be utilized to provide caption data, substantially in real-time, to the live braille device. The captioning service server 235 and/or caption management server 445 may, in turn, be configured to interface with the live braille device (e.g., via an API), to provide caption data to the live braille device.

Figure 5A:
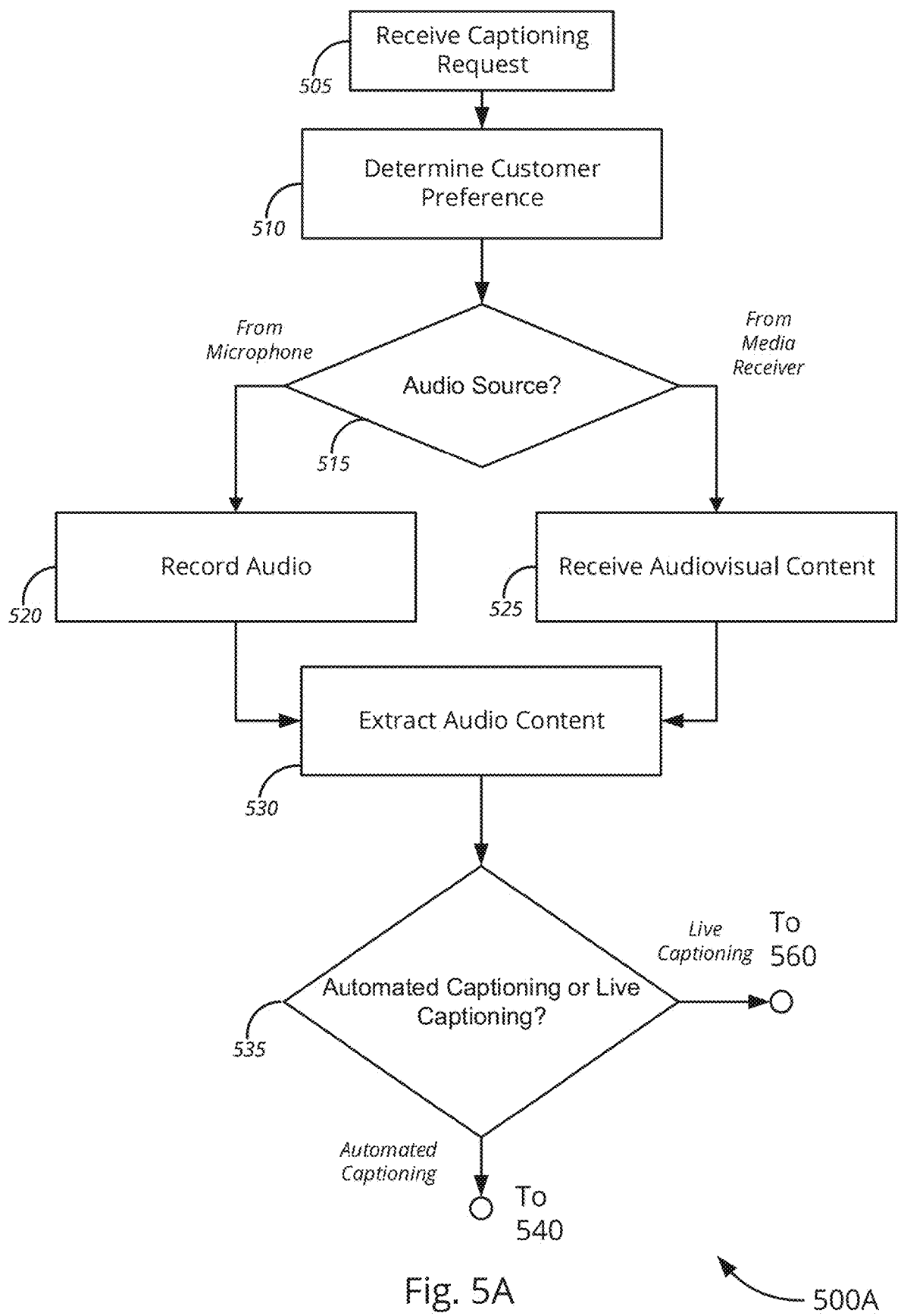
FIG. 5A is a process flow diagram illustrating a method of providing captioning services, in accordance with various embodiments.

FIG. 5A is a process flow diagram illustrating a method 500A of providing captioning services. The method 500A begins, at block 505, by receiving a captioning service request. The captioning service request may be generated by a source captioning device and transmitted to a caption management server, as described above.

At block 510, the caption management server may determine a customer preference. The customer preference may include preferences related to captioning services, including, but not limited to, a preference as to a specific captioning service provider to be used, language preferences, audio source preferences, and a preference for live or automated captioning services.

At decision block 515, an audio source may be determined. If the audio source is a microphone, audio is recorded by the microphone, at block 520. If the audio source is from a media receiver, such as the analog and digital content receivers described with respect to FIG. 1, the audiovisual content is received from the media receiver, at block 525.

At block 530, the audio content is extracted from the audiovisual content or from the audio recording. The method then progresses to decision block 535, where it is determined automated captioning or live captioning is requested. If automated captioning service is selected, the method 500A continues as described below with respect to FIG. 5B. If live captioning service is selected, the method 500A continues as described below with respect to FIG. 5C.

Figure 5B:
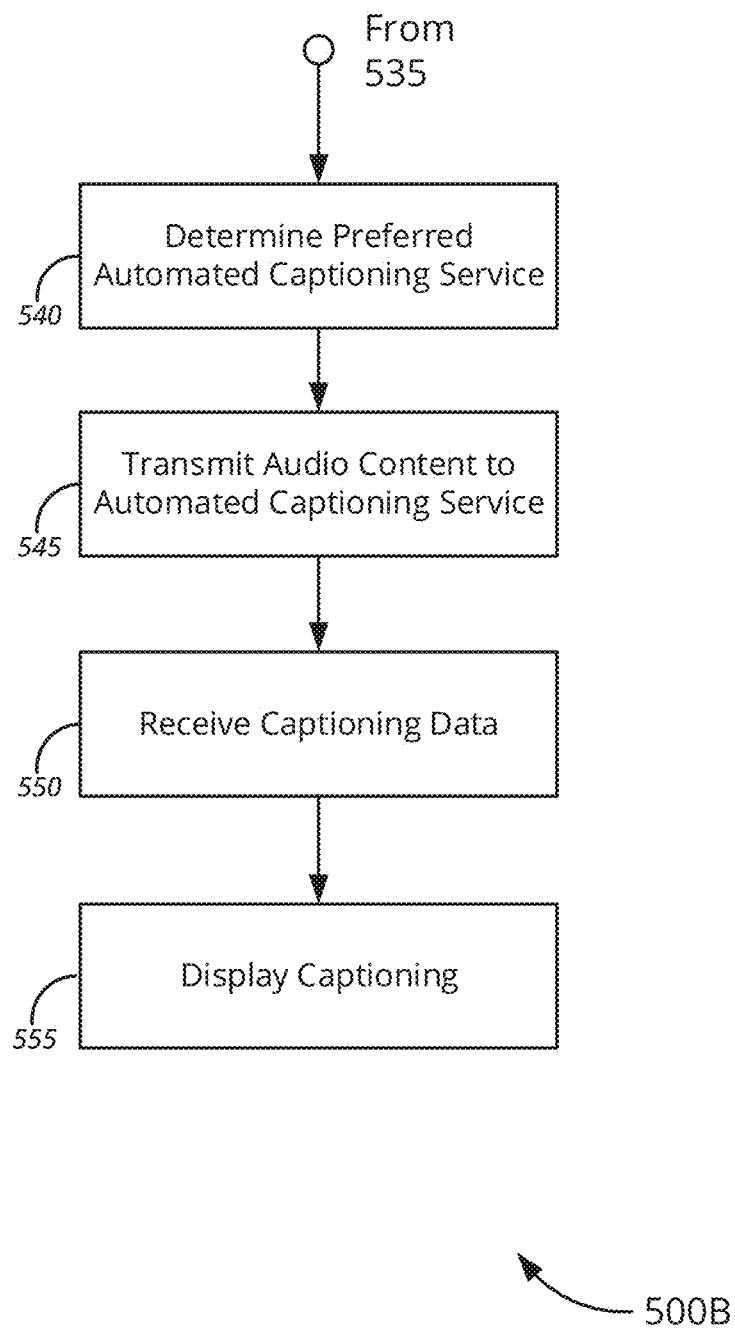
FIG. 5B is a process flow diagram illustrating a method of providing automated captioning services, in accordance with various embodiments.

FIG. 5B is a process flow diagram illustrating a method 500B of providing automated captioning services, in accordance with various embodiments. The method 500B begins, at block 540, by determining a preferred automated captioning service provider. At block 545, audio content is then transmitted to the automated captioning service provider, as indicated by the customer preferences. At block 550, caption data is then received, from the automated captioning service provider. As described, the caption data may be transmitted to the source captioning device via the caption management server. Accordingly, the captioning service provider transmit caption data to the caption management server, for further distribution to the source captioning device, remote device(s), and/or third party platforms.

Figure 5C:
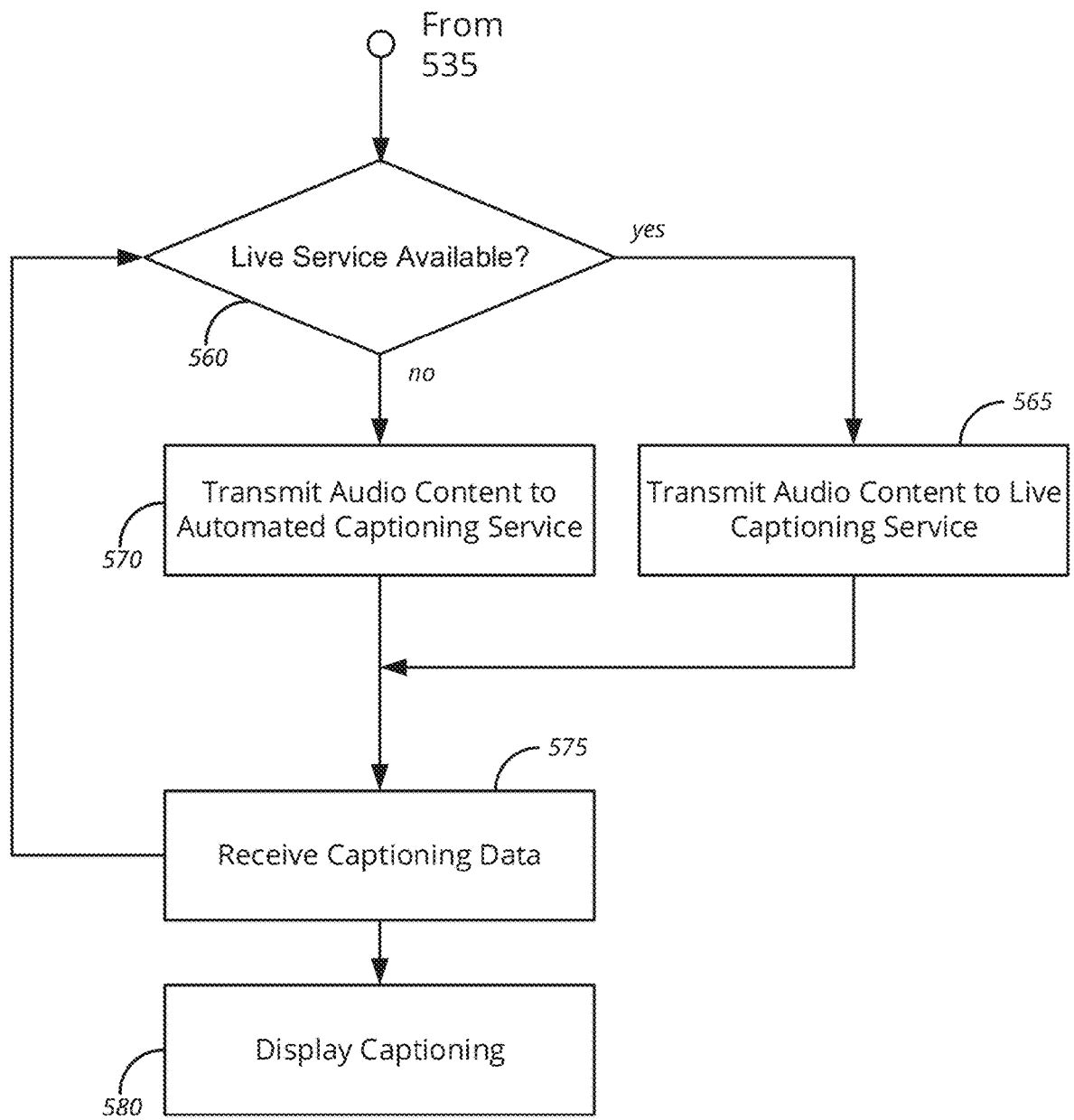
FIG. 5C is a process flow diagram illustrating a method of providing live captioning services, in accordance with various embodiments.

FIG. 5C is a process flow diagram illustrating a method 500C of providing live captioning services. The method 500C begins, at decision block 560, by determining whether a live caption resource is available. If the live caption resource is available, the audio content is transmitted, at block 565, to the live captioning service provider. If the live caption resource is unavailable, the audio content is transmitted, at block 570, to an automated captioning service, as previously described with respect to FIGS. 1 & 2, until the live caption resource becomes available. Thus, at block 575, caption data is received from the live captioning service provider, and the method 500C returns to decision block 560, to determine whether the live caption resource has become available. Meanwhile, the caption data may be transmitted to the source captioning device. At block 580, the caption data may then be displayed by the source captioning device, remote device, or through a third party platform.

While the methods of FIGS. 5A-5C are illustrated, for ease of description, as different methods, it should be appreciated that the various techniques and procedures of these methods can be combined in any suitable fashion, and that, in some embodiments, the methods depicted by FIGS. 5A-5C can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 5A-5C can be implemented by (and, in some cases, are described below with respect to) the system 100, 200, 300, 400 of FIGS. 1-4 (or components thereof), these methods may also be implemented using any suitable hardware implementation. Similarly, while the systems 100, 200, 300, 400 of FIGS. 1-4 (and/or components thereof) can operate according to the methods illustrated by FIGS. 5A-5C and/or the techniques described in the Appendix (e.g., by executing instructions embodied on a computer readable medium), the systems 100, 200, 300, 400 can also operate according to other modes of operation and/or perform other suitable procedures.

Figure 6:
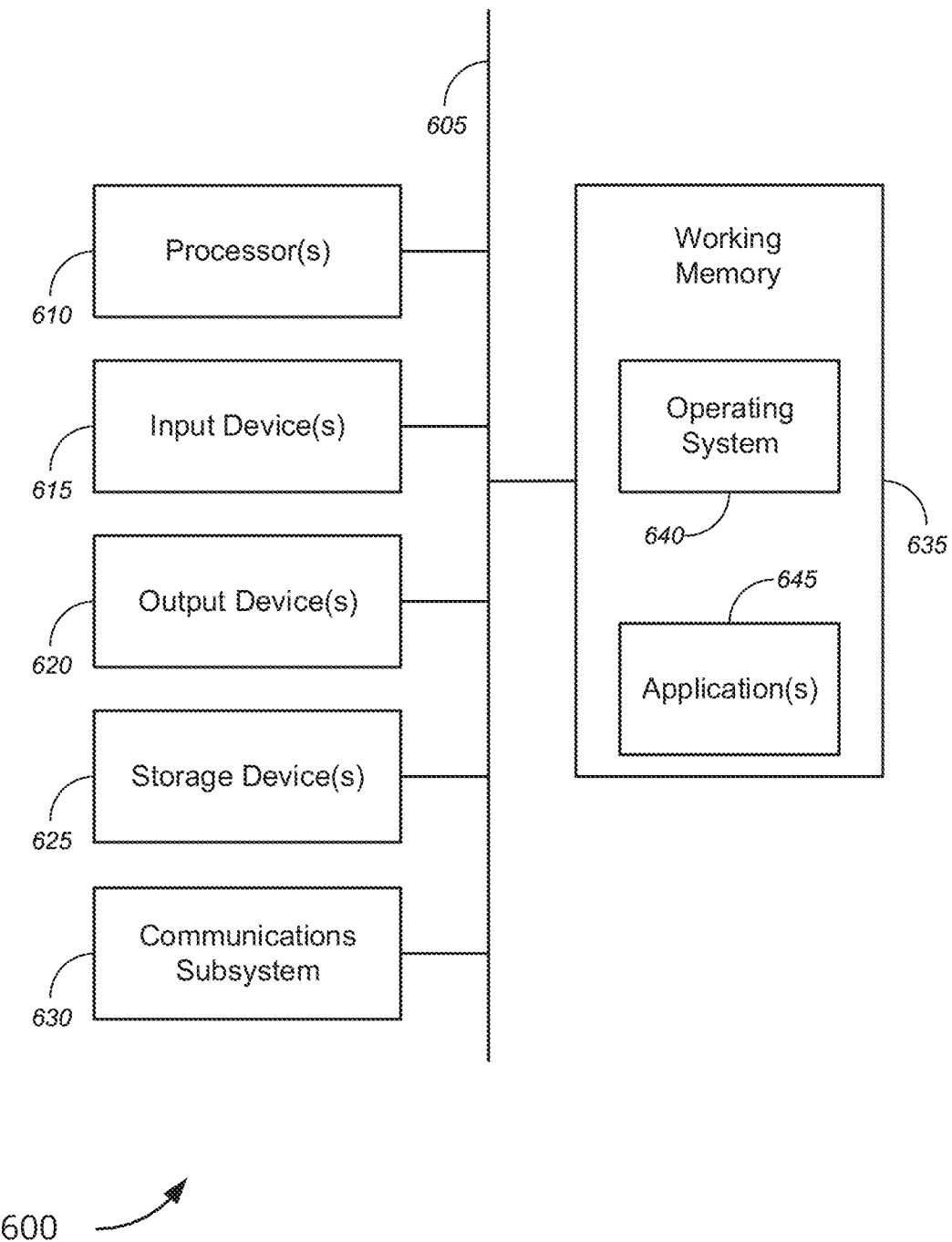
FIG. 6 is a schematic block diagram of a computer system, in accordance with various embodiments.

FIG. 6 is a schematic illustration of one embodiment of a computer system 600 configured to perform the methods provided by various other embodiments, as described herein. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer system 600 includes multiple hardware elements that may be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and microcontrollers); one or more input devices 615, which include, without limitation, a mouse, a keyboard, a stenotype, microphone, one or more sensors, and/or the like; and one or more output devices 620, which can include, without limitation, a display device, and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 600 might also include a communications subsystem 630, which may include, without limitation, a modem, a network card (wireless or wired), an IR communication device, a wireless communication device and/or chip set (such as a Bluetooth™ device, an 802.11 device, a WiFi device, a WiMax device, a WWAN device, a Z-Wave device, a ZigBee device, cellular communication facilities, etc.), and/or a low-power wireless device. The communications subsystem 630 may permit data to be exchanged with a network (such as the network described below, to name one example), with other computer or hardware systems, between data centers or different cloud platforms, and/or with any other devices described herein. In many embodiments, the computer system 600 further comprises a working memory 635, which can include a RAM or ROM device, as described above.

The computer system 600 also may comprise software elements, shown as being currently located within the working memory 635, including an operating system 640, device drivers, executable libraries, and/or other code, such as one or more application programs 645, which may comprise computer programs provided by various embodiments (including, without limitation, various applications running on the various servers, source captioning devices, and live caption resource as described above), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally receives the signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a storage device 625 either before or after execution by the processor(s) 610.

Figure 7:
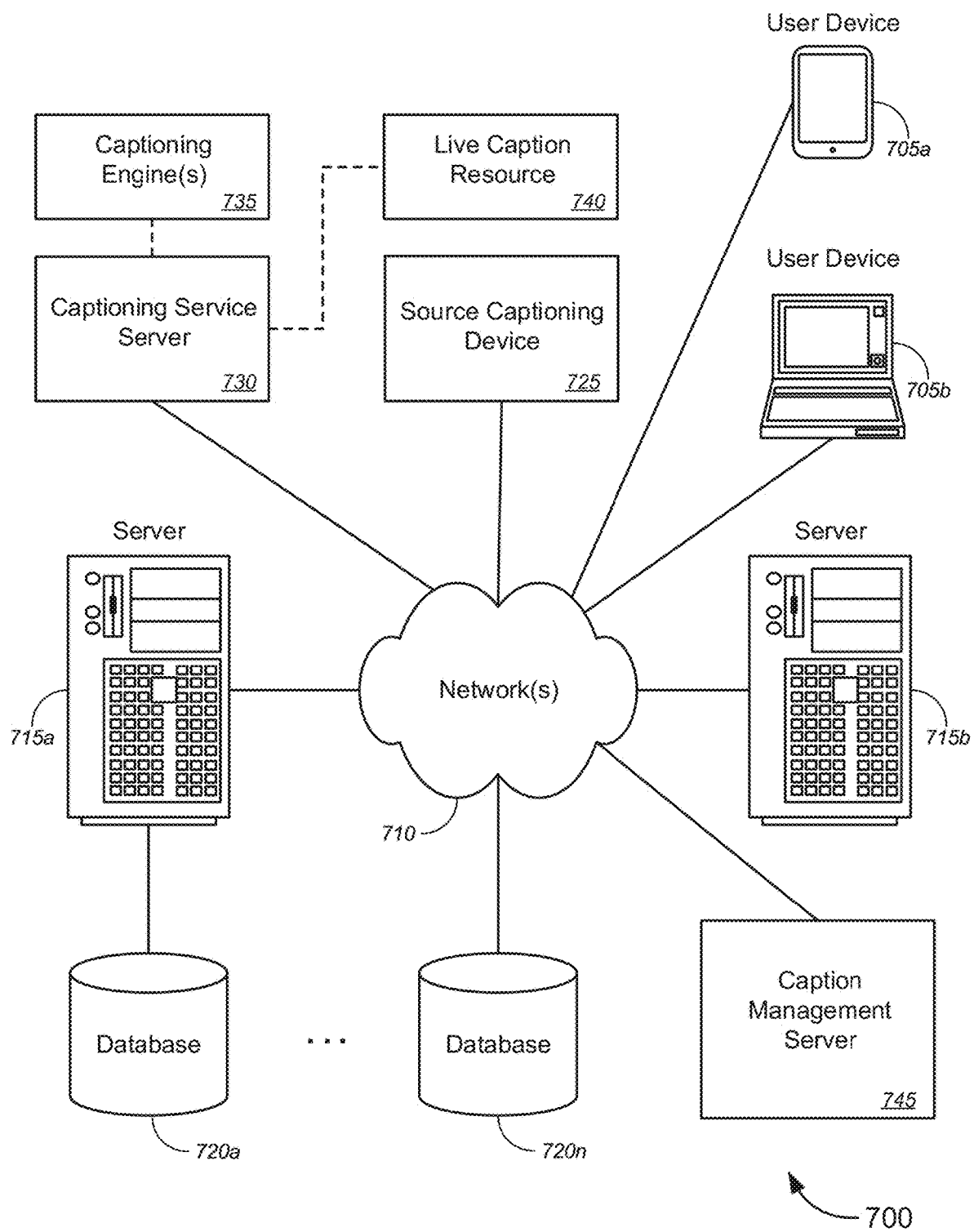
FIG. 7 is a block diagram of a networked system of computing systems for providing live captioning services, in accordance with various embodiments.

FIG. 7 is a block diagram illustrating a networked system 700 of computing systems, which may be used in accordance with various embodiments. The system 700 may include one or more user devices 705. A user device 705 may include, merely by way of example, desktop computers, single-board computers, tablet computers, laptop computers, handheld computers, and the like, running an appropriate operating system, which in various embodiments may include an AI engine and/or learning API as previously described. User devices 705 may further include cloud computing devices, IoT devices, servers, and/or workstation computers running any of a variety of operating systems. In some embodiments, the operating systems may include commercially-available UNIX™ or UNIX-like operating systems. A user device 705 may also have any of a variety of applications, including one or more applications configured to perform methods provided by various embodiments, as well as one or more office applications, database client and/or server applications, and/or web browser applications. Alternatively, a user device 705 may include any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user devices 705, any number of user devices 705 may be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, MoCA, MQTT, CoAP, AMQP, STOMP, DDS, SCADA, XMPP, custom middleware agents, Modbus, BACnet, NCTIP 1213, Bluetooth, Zigbee/Z-wave, TCP/IP, SNA™, IPX™, AppleTalk™, and the like. Merely by way of example, the network(s) 710 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 702.11 suite of protocols, the Bluetooth™ protocol known in the art, low-power wide area network (LPWAN) protocols, such as long range wide area network (LoRaWAN), narrowband IoT (NB-IoT); long term evolution (LTE); Neul; Sigfox; Ingenu;

IPv6 over low-power wireless personal area network (6LoWPAN); low power Wi-Fi; cellular communications (e.g., 2G, 3G, 4G, 5G & LTE); Z-wave; Thread; near field communications (NFC); radio frequency identification (RFID); and/or any other wireless protocol; and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications, programs, web-based services, or other network resources accessible by a client. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing media content streaming or playback, and, more particularly, to methods, systems, and apparatuses for implementing video tuning and wireless video communication using a single device in which these functionalities are integrated, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720*a*-720*n* (collectively, "databases 720"). The location of each of the databases 720 is discretionary: merely by way of example, a database 720*a* might reside on a storage medium local to (and/or resident in) a server 715*a* (or alternatively, user device 705). Alternatively, a database 720*n* can be remote from any or all of the computers 705, 715, 725, 730, 735 so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715, 725, 730, 735 can be stored locally on the respective computer and/or remotely, as appropriate.) In one set of embodiments, the database 720 may be a relational database configured to host one or more data lakes collected from various data sources, user devices 705, or other sources. Relational databases may include, for example, an Oracle database, that is adapted to store, update, and retrieve data in response to SQL-formatted commands. The database might be controlled and/or maintained by a database server.

The system 700 may further include a source captioning device 725, a captioning service server 730, coupled to one or more captioning engines 735 and live caption resource 740, and a caption management server 745. The source captioning device 725 may be coupled to one or more of the captioning service server 730 and/or caption management server 745 via the network 710. In various embodiments, the source captioning device 725 may be configured to receive a source input, and provide audio content from the source input to one or more of a caption management server 745 and/or captioning service server 730. The captioning service server 730 may be configured to transmit the audio content to one or captioning engines 735, live caption resource 740, or both. The captioning service server 730 may then generate caption data to be provided to one or more of the source captioning device 725 and/or caption management server 745. The caption management server 745 may further be configured to provide the caption data to one or more of the source captioning device 725, or one or more remote devices, such as user devices 705*a*-705*b*.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
   a caption management server;
   a source captioning device in communication with the caption management server, the source captioning device comprising:
      a processor;
      non-transitory computer readable media having encoded thereon computer software comprising a set of instructions executable by the processor to:
         generate a request to initiate captioning service;
         transmit the request to the caption management server;
         receive, via one or more source inputs, audio content;
         transmit the audio content to a captioning service provider as determined by the caption management server;
         receive, via the caption management server, caption data from the captioning service provider;
      wherein the caption management server is configured to:
         receive, from the source captioning device, the request;
         determine a type of captioning service requested, wherein the type of captioning service includes at least one of an automated captioning service or live captioning service;
         determine the captioning service provider for the source captioning device to transmit the audio content based, at least in part, on the type of captioning service requested; and
      wherein if automated captioning service is requested, the caption management server is further configured to:
         determine one or more captioning engines to utilize for automated captioning service;
         determine one or more respective captioning service providers associated with the one or more captioning engines; and
         connect the source captioning device to the one or more respective captioning service providers.

2. The system of claim 1, wherein the one or more source inputs includes a microphone, wherein the source captioning device is coupled to the microphone, wherein the source captioning device is further configured to receive the audio content via the microphone.

3. The system of claim 1, wherein the set of instructions are further executable to:
   receive audiovisual content; and
   extract the audio content from the audiovisual content.

4. The system of claim 1, wherein if live captioning service is requested, the caption management server is further configured to:
   determine whether a live caption resource of the captioning service provider is available;
   in response to determining the live caption resource is available, connect the source captioning device to the live caption resource of the captioning service provider;
   in response to determining the live caption resource is not available, connect the source captioning device to an automated captioning service provider until the live caption resource becomes available.

5. The system of claim 1, wherein the caption management server further comprises an application programming interface configured to allow access to the caption data for the audio content, via the application programming interface, by one or more remote devices.

6. The system of claim 1, wherein the caption management server is further in communication with a third party provider, wherein the caption management server is further configured to provide at least one of the caption data, or metadata associated with the caption data, to the third party provider.

7. The system of claim 1, wherein the source captioning device is operatively coupled to an output device, wherein the set of instructions is further executable to cause, via the output device, the caption data to be displayed.

8. The system of claim 1, wherein the set of instructions is further executable to generate a customer profile based on customer input, wherein the customer profile includes a captioning service provider preference, wherein the caption management server is configured to:
   determine whether the customer profile exists on the source captioning device;
   in response to determining that the customer profile exists, determine, based on the customer profile, the captioning service provider preference;
   in response to determining that the customer profile does not exist, obtain the captioning service provider preference via a prompt for customer input at the source captioning device; and
   connect the customer facing device to a captioning service provider as indicated by the captioning service provider preference.

9. A method comprising:
   receiving, at a source captioning device, a request to initiate captioning service;
   transmitting, via the source captioning device, the request to a caption management server;
   receiving, with the caption management server, the request;
   determining, with the caption management server, a type of captioning service requested, wherein the type of captioning service includes at least one of an automated captioning service or live captioning service;

determining, via the caption management server, whether an automated captioning service or live captioning service is requested;

determining, at the caption management server, the captioning service provider for the source captioning device to transmit the audio content based, at least in part, on the type of captioning service requested, wherein in response to determining that automated captioning service is requested, determining the caption service provider includes determining one or more captioning engines to utilize for automated captioning service, and determining one or more respective captioning service providers associated with the one or more captioning engines;

connecting, via the caption management server, the source captioning device to a captioning service provider based, at least in part, on the type of captioning service requested, wherein in response to determining that automated captioning service is requested, connecting the source captioning device to the captioning service provider includes connecting the source captioning device to the one or more respective captioning service providers;

transmitting, via the source captioning device, audio content to the captioning service provider as determined by the caption management server;

receiving, via the caption management server, caption data from the caption service provider; and transmitting, via the caption management server, the caption data to the source captioning device.

10. The method of claim 9, further comprising:

generating, at a source captioning device, a customer profile based on customer input;

determining, via the caption management server, whether the customer profile exists on the source captioning device;

determining, via the caption management server, in response to determining that the customer profile exists, a captioning service provider preference based on the customer profile; and obtaining, via the caption management server, in response to determining that the customer profile does not exist, the captioning service provider preference via customer input.

11. The method of claim 9 further comprising:

determining, in response to determining that live captioning service is requested, whether a live caption resource of a live captioning service provider is available;

connecting, in response to determining that the live caption resource is available, the source captioning device to the live caption resource;

connecting, in response to determining that the live caption resource is not available, the source captioning device to the automated captioning service provider until the live caption resource becomes available.

12. The method of claim 9, further comprising:

providing, via the caption management server, an application programming interface; and allowing, via the application programming interface, access to the caption data by one or more remote devices.

13. The method of claim 9, further comprising:

providing, via the caption management server, at least one of the caption data or metadata associated with the caption data, to a third party provider; and allowing, via the caption management server, caption data to be accessed by one or more user devices via the third party provider.

14. The method of claim 9, further comprising:

causing, via an output device operatively coupled to the source captioning device, the caption data to be displayed.

15. An apparatus comprising:

at least one processor;

non-transitory computer readable media having encoded thereon computer software comprising a set of instructions executable by the at least one processor to:

generate a customer profile based on customer input;

receive a request to initiate captioning service;

transmit the request to a caption management server;

determine the type of captioning service requested, wherein the type of captioning service includes at least one of an automated captioning service or live captioning service;

wherein in response to determining that automated captioning service is requested:

receive, via the caption management server, a determination of one or more respective captioning service providers associated with one or more captioning engines for automated captioning service;

receive audio content;

transmit the audio content to a captioning service provider, as indicated by the caption management server, wherein in response to determining that automated captioning service is requested, transmitting the audio content to a captioning service provider includes transmitting the audio content to the one or more respective captioning service providers;

receive, via the caption management server, caption data from the captioning service provider.

16. The apparatus of claim 15, further comprising a source input coupled to a microphone, wherein the set of instructions further includes instructions executable by the at least one processor to receive the audio content via the microphone.

17. The apparatus of claim 15, wherein the set of instructions further includes instructions executable by the at least one processor to:

receive audiovisual content; and extract the audio content from the audiovisual content.

18. The apparatus of claim 15, further comprising an output device, wherein the set of instructions further includes instructions executable by the at least one processor to cause, via the output device, the caption data to be displayed.

* * * * *